(12) United States Patent  
Sprehe (10) Patent No.: US 7,467,893 B2
(45) Date of Patent: *Dec. 23, 2008

(54) RECLOSABLE PLASTIC BAG

(75) Inventor: Gregory Sprehe, Carterville, IL (US)

(73) Assignee: Com-Pac International, Inc., Carbondale, IL (US)

( * ) Notice: Subject to any disclaimer, the term of this patent is extended or adjusted under 35 U.S.C. 154(b) by 700 days.

This patent is subject to a terminal disclaimer.

(21) Appl. No.: 11/049,910

(22) Filed: Feb. 3, 2005

(65) Prior Publication Data

US 2005/0129338 A1 Jun. 16, 2005

Related U.S. Application Data

(60) Continuation-in-part of application No. 10/360,184, filed on Feb. 6, 2003, now abandoned, which is a division of application No. 09/524,439, filed on Mar. 14, 2000, now Pat. No. 6,576,278.

(51) Int. Cl.
*B65D 33/16* (2006.01)
*A44B 19/00* (2006.01)

(52) U.S. Cl. .................. 383/63; 24/585.12
(58) Field of Classification Search ............ 383/63, 383/64, 59; 24/399, 400, 403, 405, 409, 24/410, 401, 384, 389, 585.12, 588.1
See application file for complete search history.

(56) References Cited

U.S. PATENT DOCUMENTS

| 3,117,874 A | 1/1964 | Horan |
| 3,204,855 A | 9/1965 | Boynton et al. |
| 3,672,122 A | 6/1972 | Berger et al. |
| 3,742,950 A | 7/1973 | Endrody |
| 3,776,408 A | 12/1973 | Wald |
| 3,790,017 A | 2/1974 | Fitzpatrick et al. |
| 3,822,806 A | 7/1974 | Grimes |
| 4,201,299 A | 5/1980 | Bumgarner et al. |
| 4,238,040 A | 12/1980 | Fitzpatrick |
| 4,339,046 A | 7/1982 | Coen |
| 4,466,547 A | 8/1984 | Klittich |

(Continued)

FOREIGN PATENT DOCUMENTS

DE 3727321 A1 3/1989

(Continued)

*Primary Examiner*—Jes F Pascua
(74) *Attorney, Agent, or Firm*—Vedder Price PC (57) ABSTRACT

The present invention provides a reclosable bag that is substantially impermeable to oxygen by using a nylon layer in the bag side wall material. A preferred embodiment uses a bag wall comprised of low density polyethylene (LDPE) and nylon. LDPE and nylon layers are laminated together. When used as a baby bottle liner, the bag is constructed and arranged to fit into a cavity of a baby bottle. The bag includes a continuous, profiled, elongated reclosable fastener. The continuous, profiled, elongated reclosable fastener has a first continuous elongated profile strip and a second continuous elongated profile strip. The first continuous elongated profile strip and the second continuous elongated profile strip are dimensioned to provide an airtight and/or watertight seal upon interconnection thereof. The fastener provides an airtight and watertight side seal at each end of the reclosable fastener. Each side seal connects an end of the reclosable fastener to an inside surface of a front wall and an inside surface of a back wall of the liner.

24 Claims, 6 Drawing Sheets

U.S. PATENT DOCUMENTS

| | | |
|---|---|---|
| 4,501,585 A | 2/1985 | Friedman |
| 4,523,377 A | 6/1985 | Spletzer et al. |
| 4,558,792 A | 12/1985 | Cabernoch et al. |
| 4,600,104 A | 7/1986 | Yanase |
| 4,686,814 A | 8/1987 | Yanase |
| 4,711,359 A | 12/1987 | White et al. |
| 4,729,926 A * | 3/1988 | Koteles et al. ............ 428/474.7 |
| 4,731,911 A * | 3/1988 | Gould ..................... 24/585.12 |
| 4,869,912 A | 9/1989 | McCoy et al. |
| 4,919,983 A | 4/1990 | Fremin |
| 4,923,701 A | 5/1990 | VanErden |
| 4,944,418 A | 7/1990 | Wallace |
| D310,417 S | 9/1990 | Herritz |
| D315,601 S | 3/1991 | McCoy et al. |
| 5,020,680 A | 6/1991 | Bale |
| 5,167,657 A | 12/1992 | Patel |
| 5,385,251 A | 1/1995 | Dunn |
| 5,435,864 A | 7/1995 | Machacek et al. |
| 5,983,965 A | 11/1999 | Patrick |
| 6,050,432 A | 4/2000 | Koehnke |
| 6,328,082 B1 | 12/2001 | Lafond |
| 6,576,278 B1 * | 6/2003 | Sprehe ....................... 426/117 |
| 6,899,239 B1 * | 5/2005 | Gray ......................... 215/11.3 |
| 6,954,969 B1 * | 10/2005 | Sprehe ........................ 24/399 |
| 7,073,674 B2 * | 7/2006 | Knuth et al. ............... 215/11.3 |

FOREIGN PATENT DOCUMENTS

EP 0332341 A1 9/1989

\* cited by examiner

RECLOSABLE PLASTIC BAG

This is a continuation-in-part application of U.S. patent application Ser. No. 10/360,184, which was filed on Feb. 6, 2003 for a "Flangeless Reclosable Fastener," which was a divisional application of patent application Ser. No. 09/524,439, Mar. 14, 2000 which is now U.S. Pat. No. 6,576,278 entitled "Reclosable baby bottle liner and baby bottle having reclosable liner."

BACKGROUND OF THE INVENTION

This invention generally relates to reclosable plastic bags, examples of which include reclosable food storage bags and reclosable baby bottle liners for use with a baby bottle having a reclosable plastic liner with properties that permit the liner to be re-used. More particularly, this invention relates to a high-strength, resealable/reclosable plastic bag having a a reclosable fastener for resealably closing a bag such as a baby bottle liner and which also seals out oxygen.

Resealable plastic bags such as reclosable food bags nursing pouches and disposable baby bottle liners are well-known to provide convenient storage. A drawback of prior art reclosable bags is wall strength but also a bag's oxygen permeability. Regardless of how tight the reclosable seal for a bag might be, oxygen is known to pass through prior art bag wall material thereby defeating the seal that might be provided by a reclosable fastener.

There exists a need to provide a reclosable plastic bag, including one for use as a bottle liner, that is both substantially stronger than prior art plastic bags but which is also substantially watertight and airtight. By increasing the bag wall's-water-tight and airtight the characteristics of the reclosable seal are made even more valuable.

SUMMARY OF THE INVENTION

Accordingly, it is an object of the invention to overcome the shortcomings of the prior art, and in doing so provide a reclosable plastic bag, which may be used as a reclosable baby bottle liner, and that is highly resistant to both moisture and oxygen permeation. The baby bottle liner embodiment has a continuous, profiled, elongated reclosable fastener sealed to the inside walls of the liner. The continuous, profiled, elongated reclosable fastener includes a first continuous elongated profile strip and a second continuous elongated profile strip. The first continuous elongated profile strip and the second continuous elongated profile strip are sized and dimensioned to provide an airtight and/or watertight seal upon interconnection thereof.

It is a further object of the invention to provide a baby bottle liner that has an airtight and/or watertight side seal at each end of the reclosable fastener. Each of the side seals connects an end of the reclosable fastener to an inside surface of a front wall and an inside surface of a back wall of the liner.

It is yet a further object of the invention to provide a baby bottle liner that includes a gussetted bottom, and an airtight and watertight seal at the gussetted bottom.

It is another object of the invention to provide a baby bottle liner in which the first continuous elongated profile strip and the second continuous elongated profile strip each have at least two hooks thereon. The hooks on the first continuous elongated profile strip, or optionally the hooks on the second continuous elongated profile strip, are adjacent to each other. In a variant of the invention, at least one of the hooks is at an end of the first continuous elongated profile strip. A second hook of the two hooks is located proximal to the hook at the end of the first continuous elongated profile strip.

It is yet another object of the invention to provide a baby bottle liner that includes a plurality of continuous recesses along a length of each of the profile strips. At least one of the recesses is dimensioned to resealably mate with one of the hooks, in one embodiment of the invention. In yet another embodiment of the invention, at least two of the continuous recesses are dimensioned to resealably mate with the hooks.

It is yet a further object of the invention to provide a baby bottle liner in which at least one continuous recess on each the profile strips is not dimensioned to mate with the hooks, and, in a variant, provide at least one protuberance along a length of each of the profile strips dimensioned to fit securely in the one continuous recess on each of the profile strip not dimensioned to mate with the hooks.

In one variant, at least one of the hooks on the first continuous elongated profile strip is located near the center of the profile strip. In another variant of the invention the hooks are substantially symmetrically distributed on two sides of a center axis of the profile strip.

In yet another embodiment, it is an object of the invention to provide a reclosable fastener that has a plurality of ridges on a back side of each of the profile strips.

Another object of the invention is to provide a baby bottle liner that has infant formula therein. In this variant and other variants of the invention, a top end seal is placed above the reclosable fastener to keep the infant formula hermetically sealed within the liner.

Yet a further object of the invention is to provide a baby bottle with the baby bottle liner described herein, and a kit for infant nursing comprising a plurality of baby bottle liners according to the invention. The kit optionally includes a baby bottle, and/or infant formula.

In yet another embodiment of the invention, the baby bottle liner includes an additive that changes color when the temperature of the contents of the liner increases or reaches a predetermined temperature range.

It is another object of the present invention to solve these and other problems in the art, and to serve a market that demands hundreds of millions of reclosable plastic baby bottle liners annually. The objects and features of the present invention, other than those specifically set forth above, will become apparent in the detailed description of the invention set forth below and in the drawings.

In a preferred embodiment, the bag panel material is comprised of layered low-density polyethylene (LDPE) and nylon, i.e., a laminate. The LDPE and nylon bag panel has a tensile strength higher than prior art bag materials, it has a lower water vapor transfer rate but the nylon layer also provides oxygen impermeability. By using a nylon layer, the bag is made to be substantially impermeable to oxygen, providing a storage bag that is better-able to preserve perishables. One preferred composition that has bag walls made up of a laminate of a nylon layer between polypropylene layers has a water vapor transfer rate of approximately 0.62 grams per 100 square inches of material per 24 hours. The oxygen permeability of the film is (To be filled in by Greg). The bag's recloseable seal uses profile strips comprised of either polyethylene or polypropylene and are attached to the LDPE/nylon bag panels by heating or adhesive.

DETAILED DESCRIPTION OF THE INVENTION

Figure 1:
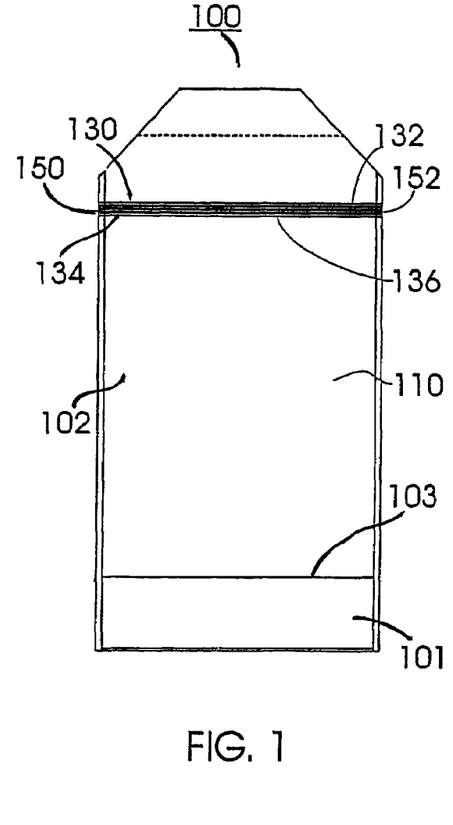
FIG. 1 is a front plan view of a reclosable baby bottle liner of the present invention.
Figure 2:
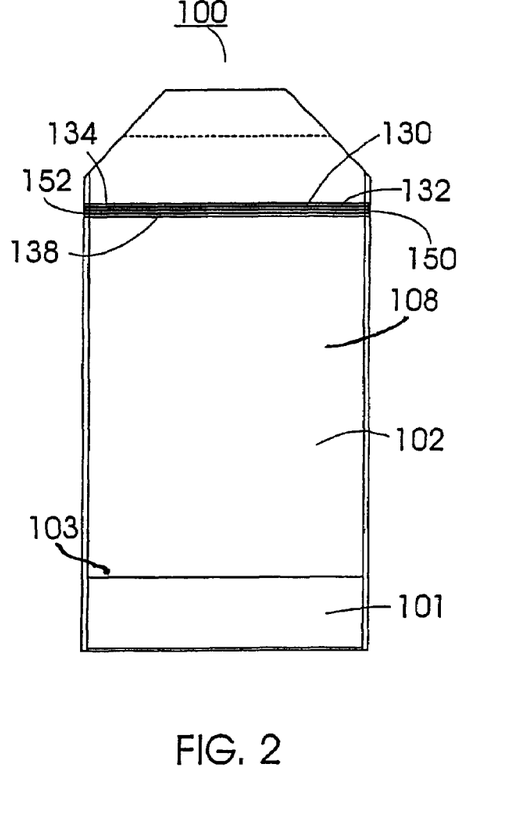
FIG. 2 is a back plan view of the liner of FIG. 1.

FIG. 1 shows the inside or interior front wall panel 110 of a resealable/reclosable bag 100 having a first half of continuous, profiled, elongated reclosable fastener 130. FIG. 2 shows the inside or interior of a back wall panel 108 of a resealable bag 100 and having the second half of a continuous, profiled elongated reclosable fastener 132. The wall panels 110 and 108 are opposing wall panels when they are joined together to form a plastic bag 100. The separate panels 108 and 110 can be joined together to form a bag 100 by heat sealing.

The first and second halves of the elongated reclosable fastener 130 include first and second continuous elongated profile strips, identified in FIGS. 1 and 2 by reference numerals 136 and 138.

Figure 2A:
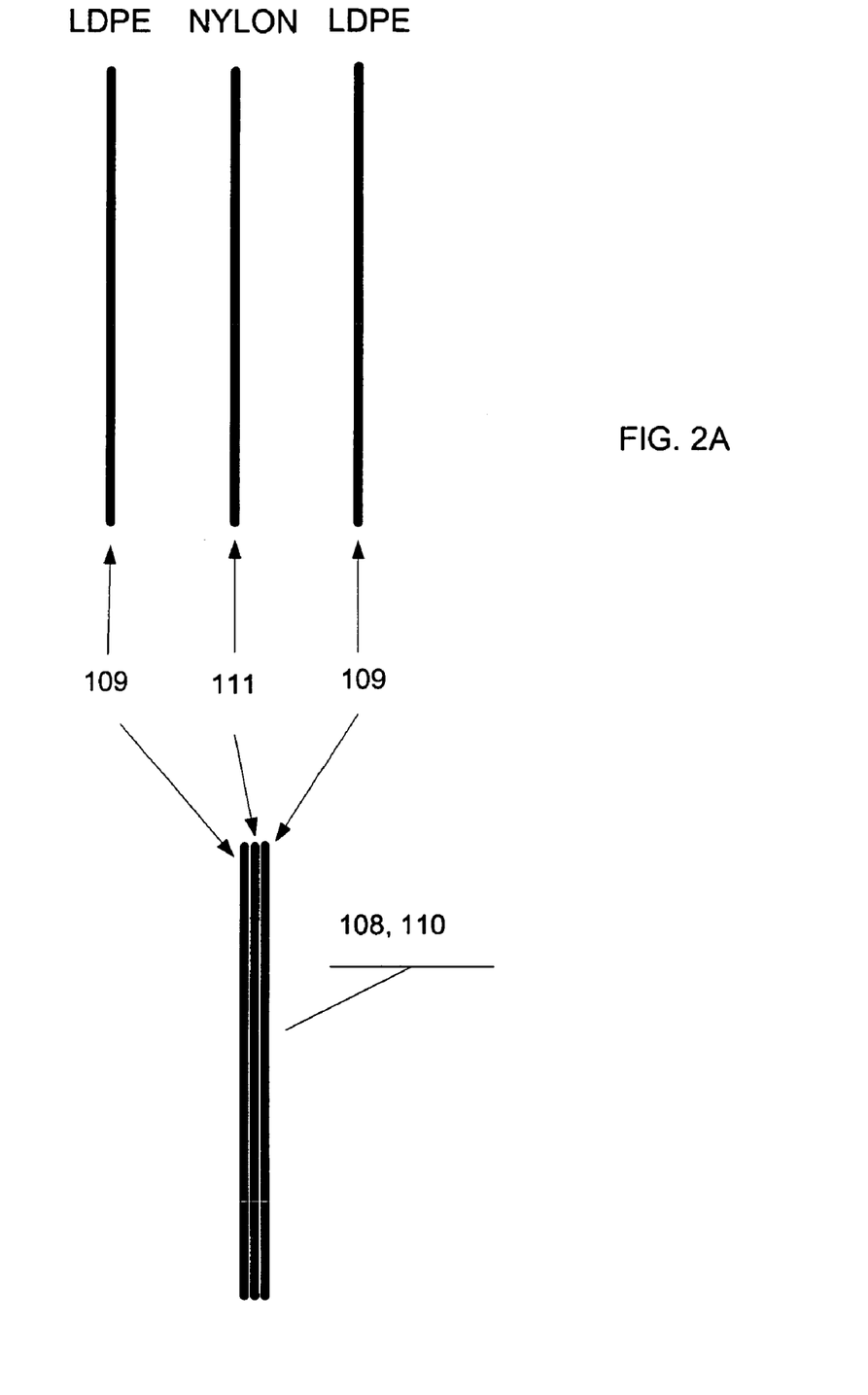
FIG. 2A shows a cross-section of the material used to make the bag walls shown in FIGS. 1 and 2 and the layers of nylon and low-density polyethylene.

The front wall 110 of the bag and the back wall 108 of the bag 100 are fabricated from a plastic film that is laminated to at least one nylon layer. The preferred embodiment bag wall material is comprised of low-density polyethylene (LDPE) and nylon layers that are laminated together as shown in FIG. 2A. The profile strips 136 and 138 on the other hand are preferably made of polypropylene, however an alternate embodiment uses profile strips 136 and 138 made from polyethylene. The LDPE/nylon combination provides a bag material with a higher tensile strength that prior art bag materials, but which is also impermeable to oxygen. The polypropylene profile strips 136 and 138 are attached to the LDPE/nylon bag film as shown in FIG. 1 using heat sealing or an adhesive in alternate embodiments.

FIG. 2A shows three different laminated layers that make up the bag walls 109 and 110. Although FIG. 2A shows a three-layer laminate, other embodiments include two layer laminates or more-than-three layer laminates. In the preferred embodiment, the outer layers 109 are polyethylene layers with the middle layer 111 being a nylon layer. The polyethylene and nylon layers are laminated together as shown in the bottom of FIG. 2A. By using at least one nylon layer, the laminate provides an oxygen-impermeable bag wall that is also much stronger than prior art bag walls that are made up of just polyethylene or just polypropylene. Those of ordinary skill in the art will recognize that other embodiments can use a bag wall having a nylon layer that is laminated to plastics other than polyethylene. Still other embodiments include using multiple nylon layers with one or more other plastic layers.

In the preferred embodiment, the bag wall material is a multi-layer, nylon core barrier film known as X3-2075, available from ISO Poly Films, Inc., 101 ISO Parkway, Gray Court, Calif. In a preferred embodiment, the bag wall material average thickness ranged between 2.3 mils and 2.7 mils. Using ASTM test method D-882, the bag material's ultimate strength ranged between 4800 psi for the 2.6 mil material and 7800 psi for 2.3 mil material. The preferred embodiment had a water vapor transfer rate (WVTR) of 0.62 grams per 100 square inches of bag material per 24 hours using the ASTM test method F-1249. Alternate embodiments include water vapor transfer rates slightly higher than but also below 0.62 grams/100 sq. in/24 hrs.

Figure 3:
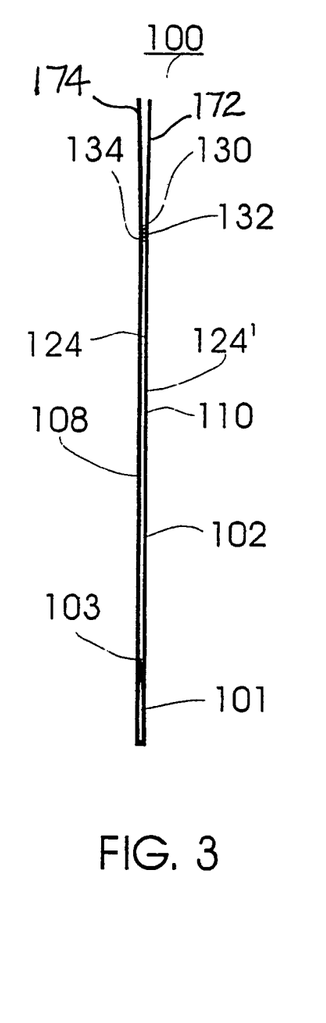
FIG. 3 is a side cross sectional view of the liner of FIG. 1.
Figure 4:
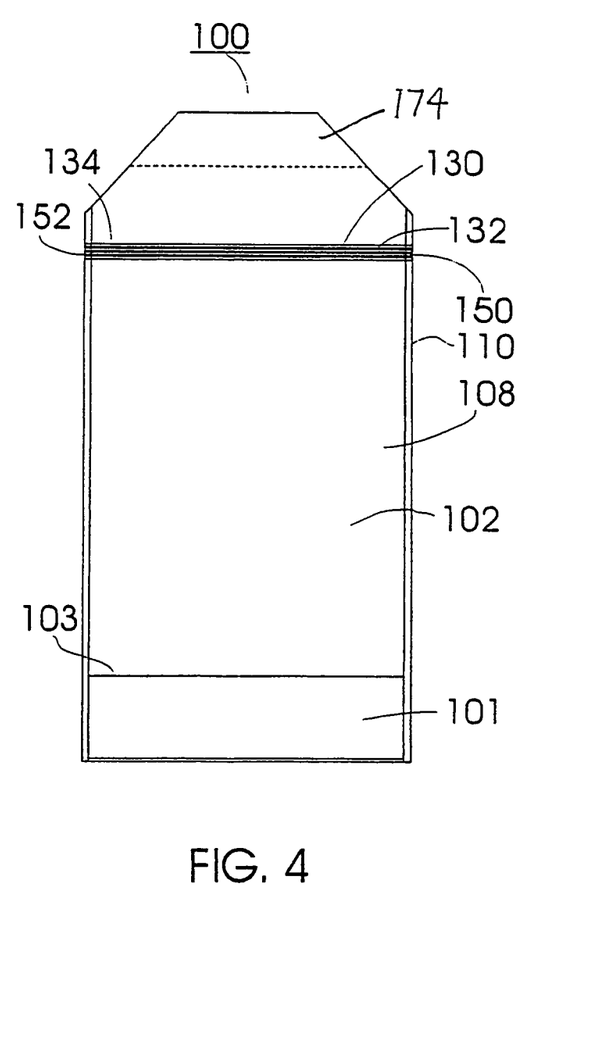
FIG. 4 is a front plan view of the liner of FIG. 1 through a side seal of the liner.

An important aspect of the invention is the fact that the first continuous elongated profile strip 136 and the second continuous elongated profile strip 138 are dimensioned to provide an airtight and watertight seal upon interconnection thereof. The airtight and/or watertight seal provide an important function of keeping foreign material including bacteria, molds, and viruses from entering the interior of the bag 100. Further, this seal will starve aerobic bacteria or other microbes inside the contents of the bag of oxygen, thus limiting or destroying their ability to replicate. Hence, the risk of deadly contamination of milk and/or other perishables in the bag 100 is reduced. Those of ordinary skill will recognize that other types and configurations of reclosable fasteners known in the prior art can also be used with the LDPE+nylon bag walls, whether or not they provide an airtight and/or watertight seal. Also important to various applications of the invention is that bag 100 includes airtight and/or watertight side seals 150, 152 at each end of said reclosable fastener, each said side seal 150, 152 connects an end of said reclosable fastener to an inside surface of a front wall 108 and an inside surface of a back wall 110 of liner 100. At each end 132, 134 of the reclosable fastener assembly 130 is an airtight and watertight side seal 150, 152. Each side seal 150, 152 connects end 132, 134 of the reclosable fastener assembly 130 to an inside surface 124 of front wall 108 and an inside surface 124 of back wall 110 (as seen in FIG. 3). Any of the seals described herein can be made by a variety of devices including heat sealers, ultrasonic sealers, and other devices known in the art. The seals also may be made with a food grade adhesive.

It should be noted that Webster's Collegiate Dictionary, Tenth Edition, defines "air tight" to mean "impermeable to air, or nearly so." Under a dictionary definition, an "air tight" seal can mean nearly impermeable to air. However, persons skilled in the bag making would construe an "air tight" reclosable seal to be defined by an industry standard air leak test known as ASTM D3078-02. Under this standard, a bag is submersed in water above which a a pressure is applied. Seal leaks are manifested as bubbles.

As used herein, an "air tight" seal means a seal that will prohibit the movement of air at atmospheric pressure and room-temperature, across or through the seal structure for a substantially long time. In other words, an airtight seal should prohibit the transfer of air molecules from the inside to the outside and vice versa. For example, an "air tight" seal should be able to keep air molecules in a bag prior to the seal's closure and air molecules outside the bag after the seal's closure, for as long as the product contained within the bag is expected to be kept reasonably fresh.

In addition to the reclosable seal being airtight however, the nylon-laminate bag wall is also substantially impermeable to oxygen thereby improving the bag's ability to preserve perishables. In particular, the nylon, oxygen-impermeable layer in the bag wall will seal out oxygen that aerobic organisms require to survive and multiply. By stopping the diffusion of oxygen through the bag's wall, aerobic organisms that find their way into the bag cannot multiply after any oxygen that might be in the bag is used up.

As stated above, liner 100 includes reclosable fastener 130. Reclosable fastener assembly 130 includes two ends 132, 134. Between ends 132, 134, a first continuous elongated profile strip 136 is releasably interlocked with a second continuous elongated profile strip 138. It is appreciated that first continuous elongated profile 136 and the second continuous elongated profile 138 can have any type of protruding male and female members which when interlocked provide an airtight and/or watertight seal.

In one variant of the invention, wherein the bag 100 embodies a baby bottle liner, which is also identified by reference numeral 100, it includes a gussetted bottom 101, and an airtight and/or watertight seal 103 at the gussetted bottom 101. The invention also contemplates placement of side gussets on liner 100 (not shown).

Figure 9:
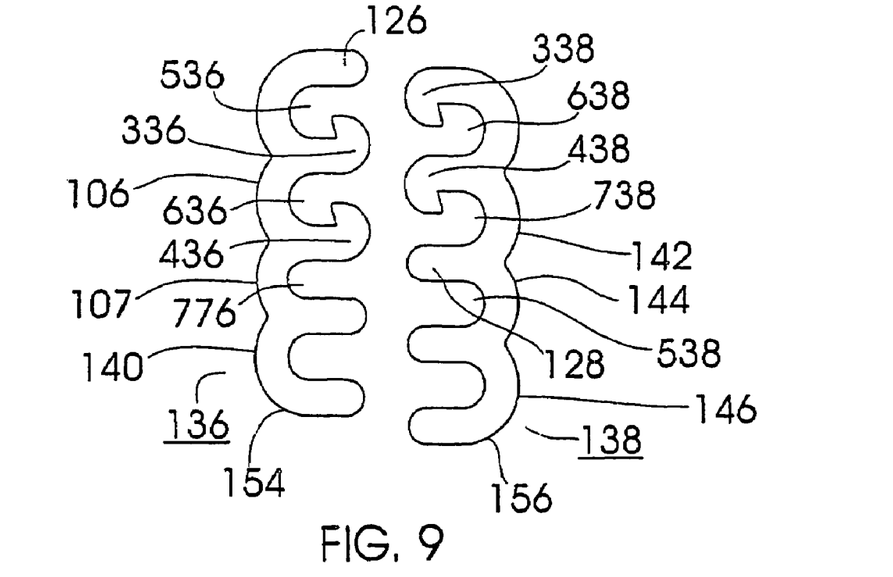

In a preferred embodiment of the invention, a particular type of reclosable fastener 130 has been found to provide a particularly durable airtight/water tight seal for use in the present invention. Fastener 130 includes first continuous elongated profile strip 136 and second continuous elongated profile strip 138 which each have at least two adjacent hooks 336, 436, 338, 438 thereon (as seen in FIG. 9). The first continuous elongated profile strip 136 has adjacent hooks 336, 436. Second continuous elongated profile strip 138 has adjacent hooks 338, 438 hooks thereon. While only two pairs of hooks 336, 436, 338 and 438 are constructed and arranged on profiles 136, 138 in the variant shown it is appreciated that a greater or lesser number of hooks can be used as desired, with a corresponding increase in width of the strips 136, 138.

Preferably, hooks 336, 436 on first continuous elongated profile strip 136 are adjacent to each other. Optionally, hooks 338, 438 on second continuous elongated profile strip 138 are also adjacent to each other in one variant of the invention. As shown in FIG. 9, at least hook 336 is at an end of first continuous elongated profile strip 136. Second hook 436 is located proximal to hook 336.

In one variant of the invention, first continuous elongated profile strip 136 has a plurality of continuous recesses 536, 636, 776 along a length of strip 136 (FIG. 9). Second continuous elongated profile strip 138 has a plurality of continuous recesses 538, 638, 738 along a length of strip 138. Of course, it is appreciated that any number of recesses can be created along strips 136, 138, including but not limited to more than three recesses and less than three recesses, with a corresponding increase/decrease in corresponding hooks and other members. In one variant of the invention, at least one of the recesses is dimensioned to resealably mate with one of hooks. As illustrated in FIG. 9, recesses 536 and 636 are substantially congruent to hooks 338, 438 such that when hooks 338, 438 are releasably interlocked into recesses 536, 636 a secure water tight and/or airtight seal is created. Similarly, recesses 638 and 738 are substantially congruent to hooks 336, 436 such that when hooks 336, 436 are releasably interlocked into recesses 638, 738 a secure water tight and/or airtight seal is also created. It is appreciated that while the geometry and arrangement of the various recesses and hooks described herein generally relates to a hook and a substantially congruent recess to the hook, a variety of suitable geometries or configurations of the male members and female members are disclosed subject only to the condition that the seal made when the profiles are interlocked is airtight and/or water tight. It is further appreciated that the present invention provides a reclosable fastener with a plurality of airtight and/or watertight seals between corresponding members of the profile strips 136, 138.

It is further appreciated that, preferably, at least two continuous recesses 536, 636 are dimensioned to resealably mate with hooks 338, 438, and/or at least two continuous recesses 638, 738 are dimensioned to resealably mate with hooks 336, 436.

Figure 8:
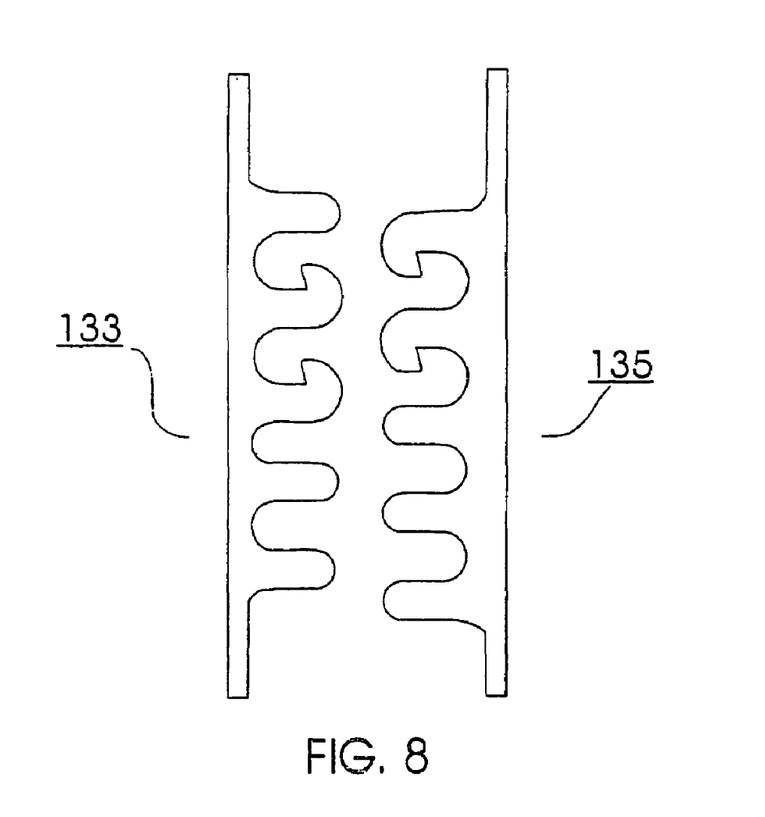
FIG. 8 is a side cross sectional view of the baby bottle liner of FIG. 1 having a continuous, profiled, elongated reclosable fastener that is a flanged reclosable fastener; and, FIG. 9 is a side cross sectional view of a reclosable fastener used with the baby bottle liner of the present invention.

In another variant of the invention, at least one continuous recess on each respective profile strip is not dimensioned to mate with a respective hook, but rather dimensioned to tightly fit into a recess that is substantially congruent to a profile member. It is appreciated that when member 126 is inserted into recess 538, the tight fit between member 126 and recess 538 also creates an additional substantially water tight and/or airtight fit. The interaction between the other recesses and members causes a similar result with the combination of the interaction of the various hooks, recesses, and members creating a substantially leak-proof failsafe seal. Of course, it is further appreciated that while the geometry of the members is as shown in FIGS. 8 and 9, any type of geometry or configuration can be used, e.g. a rectangular geometry, a triangular geometry, etc. The profile of the present invention provides for at least one protuberance along a length of each profile strip 136, 138 dimensioned to fit securely in one of the continuous recesses on each profile strip 136, 138 not dimensioned to mate with the hooks.

As further seen in FIG. 9, a plurality of ridges 106, 107, 140, 142, 144, 146 are located on back sides 154, 156 of each of profile strips 136, 138. Ridges 106, 107, 140, 142, 144, 146 provide a suitable way to obtain an airtight and/or water tight seal of back sides 154, 156 to inside surface 124 of the liner body 102 at front wall 108 and back wall 110.

As shown in FIG. 9, at least one of hooks 338, 438 on first continuous elongated profile strip 138 is located near center axis C of profile strip 138. In this variant of the invention, one or more hooks 338, 438 are substantially symmetrically distributed on two sides of center axis C of profile strip 138. Having the various hooks, recesses, and members constructed and arranged as described herein allows for an airtight and/or watertight seal.

Figure 5:
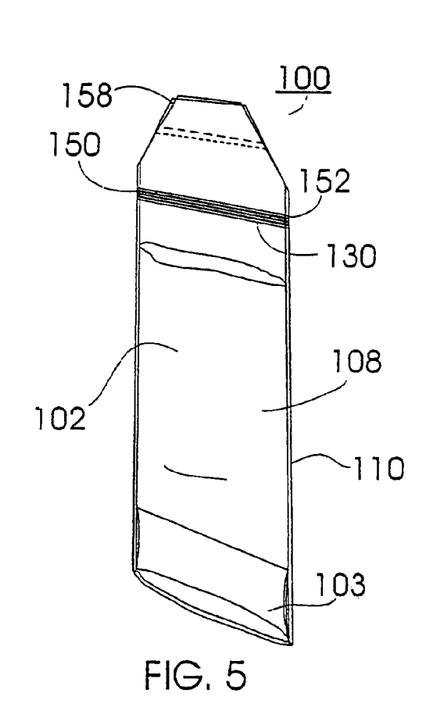
FIG. 5 is a front perspective view of the baby bottle liner of FIG. 1 including infant formula and a top end seal above the reclosable fastener.

Optionally, baby bottle liner 100 can also have infant formula or other nutritional supplement or drink within liner body 102 (FIG. 5). In this scenario, the airtight and/or watertight seal formed with reclosable fastener 130 is particularly helpful as the contents are hermetically sealed within the liner body 102 until they are ready for use. Top end seal 158 can also optionally be added above reclosable fastener 130 to reduce the risk of contamination of the contents of the liner body 102.

Figure 6:
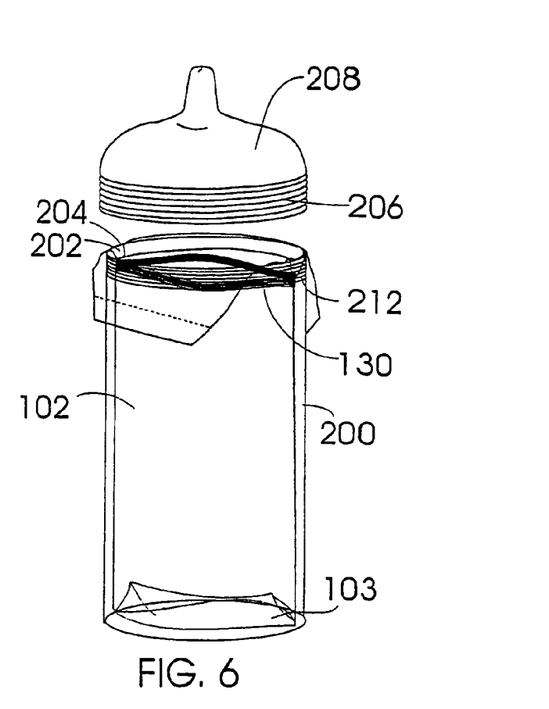
FIG. 6 is a front perspective view of a kit of the present invention having a baby bottle with the baby bottle liner of FIG. 1 therein.
Figure 7:
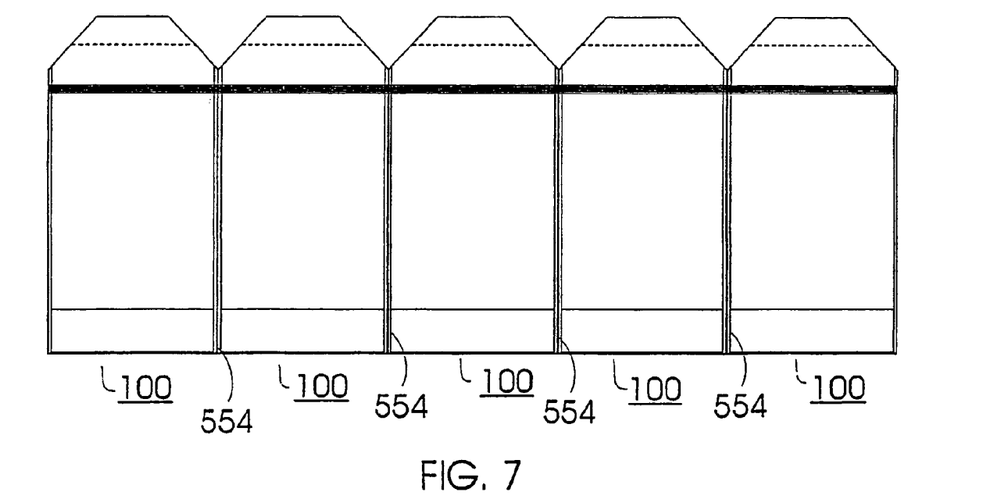
FIG. 7 is a front perspective view of a plurality of chain of baby bottle liners according to FIG. 1.

It is appreciated that liner 100 of the present invention is used with baby bottle 200 and located within a cavity 202 therein (FIG. 6). In addition to being used with baby bottle 200, the present invention provides kit 550 for infant nursing which is composed of a plurality of baby bottle liners 100 (FIG. 7). Each baby bottle liner 100 can be dispensed from a roll of baby bottle liners 100 by being removably connected to one another and detached from one another by a frangible connection between each respective liner 100 such as a perforation 100A or other suitable means. Alternatively, the kit 100 can also be composed of individual liners 100 which can be packed within a box or other appropriate container (not shown) such that a nursing mother can readily have access to liners 100 as the need arises. In another variant, each individual liner 100 or a plurality of liners 100 can be hermetically sealed within a non-reclosable plastic bag (not shown) that may be torn open as the need arises. Kit 550 can also include formula, nutritional drinks, baby bottle nipples, one or more baby bottles 200 of various sizes and/or liners 100 of various sizes, sized, arranged and constructed with kit 550 for ease of access and use with respective baby bottles 200.

Yet another variant of the invention provides liner 100 that is constructed of a food grade microwavable LDPE and nylon that permits the contents of the liner 100 to be placed in a microwave for re-heating of the contents to a suitable temperature. It is appreciated that this feature of the invention permits several of the most common problems associated infant nursing to be solved, e.g. re-use and re-heating of mother's milk or infant formula. It is also appreciated that the plastic is chosen to eliminate or minimize any leaching that may occur.

The liner 100 also optionally comprises an additive that is extruded with liner 100. The additive changes color when the temperature of the contents of the liner increases or turns a predetermined color when the contents of the liner 100 are at a suitable temperature. Liner 100 may also optionally have a temperature indicator or temperature range indicator associated with the liner 100, e.g. connected thereto or placed as a strip on or in liner 100 that changes color when the temperature of the contents of the liner increases or reaches a predetermined desirable temperature or temperature range. This feature solves the common problem of providing the infant formula or mother's milk at an appropriate temperature that is neither too hot nor too cold for the child. This feature of the invention permits the temperature of the contents of the liner 100 to be visually determined prior to infant nursing.

While the embodiment of the invention shown in FIG. 9 illustrates a reclosable fastener 130 that is a string zipper without lateral sealing flanges, it will also be appreciated that reclosable fastener 130 can also include a flanged reclosable fastener 131 as shown in FIG. 8. The flanged reclosable fastener 131 of FIG. 8 comprises at least two substantially planar flanges 133, 135, each of which carries two or more adjacent interlocking resealable hooks. Flanges 133, 135 are sealed to front wall 108 and/or back wall 110 of baby bottle liner 100 with airtight and/or watertight flange seals 137, 139. By providing flanges 133, 135, the problems associated with sealing an irregularly shaped surface, e.g. a zipper profile, to a smooth surface are eliminated. The flange 133 and flange 135 provide a substantially smooth, planar and uniform surface to which to seal the inside surface 124 and walls 108, 110 of liner body 102. To improve the appearance and air and water-tightness of liner 100, it is preferred that the length L of the reclosable fastener assembly 130 is less than the width W of back wall 110 (FIG. 1).

In a variant of the invention, liner 100 includes a frangible access 155 (FIG. 5). Access 155 can take many forms including a crease line, a score line, or a plurality of perforations. Preferably, access 155 is substantially parallel to the reclosable fastener assembly 130 or access 155 may be sinusoidally shaped from aesthetic purposes. Removal of access 155 exposes the releasable fastener assembly 130 and provides access to the reclosable fastener 130. One feature of the invention is that frangible access 155 is located both on the front wall 108 and on the back wall 110 of the liner body 102 adjacent the reclosable fastener assembly 130 and above the top end seal 158 (FIG. 5). In a preferred embodiment, frangible access 155 comprises a plurality of perforations 157.

As set forth above, the film from which liner body 102 is constructed is preferably made from low-density polyethylene (LDPE) and nylon with the nylon layer limiting the diffusion of oxygen through the bag wall. The film is folded and sealed such that bottom gussets 101 are created in a conventional manner. Optionally, side gussets (not shown) are also added to liner body 102. It is appreciated that the gussetting feature increases the overall carrying capacity of the liner 100 and makes the bottle 200 with liner 100 generally more stable where the entire bottle is filled with formula and the like.

The seals used in the present invention can be made using conventional sealing techniques, which include by way of example heat sealing, ultrasonic sealing, adhesive sealing, etc. To aid in the formation of the airtight and/or watertight seals used in the present invention, it is appreciated that the length L of the reclosable fastener 130 is less than the length of front wall 108 and/or back wall 110 that form liner body 102.

Figure 10:
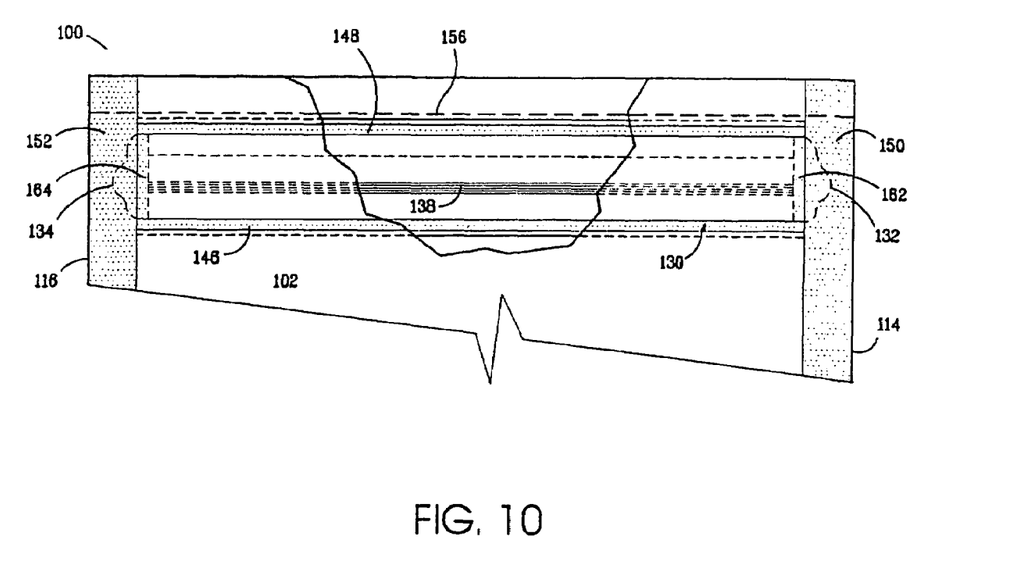
FIG. 10 is a front partial cross sectional plan view of the baby bottle liner of FIG. 1 including the top end seal above the reclosable fastener.

As seen in FIG. 10, side seals 150, 152 are placed at each end of the reclosable fastener assembly 130. Side seals 150, 152 provide an airtight and/or watertight seal between the inside surface 124 of film 112 and reclosable fastener assembly 130. Each of the side seals 150, 152 connects an end 132, 134 of the reclosable fastener 130 to the inside surfaces 124, 124' of the rectangular sheet of film inwardly of liner edges 114, 116 of the liner body 102 thereby preventing air or liquids from entering or leaving the liner through the ends 132, 134 of the reclosable fastener assembly 130. Preferably, prior to sealing of reclosable fastener 130 to front wall 108 and/or back wall 110, the ends 132, 134 of reclosable fastener 130 are splotched or compression molded. Splotching of reclosable fastener ends 132, 134 creates substantially flattened ends 162, 164 which facilitate the formation of the airtight and/or watertight seals of the invention. It is appreciated that these side seals substantially reduce the risk of contamination of the contents of bag liner body 102.

It is appreciated that reclosable fastener assembly 130 can take many forms. Preferably, profile strips 136, 138 are each made from a single, extruded, flexible polymeric material. Further, tearoff tabs 172, 174 can be added to walls 108, 110 above to assist in placing of liner 100 in bottle 200.

Properly feeding, locating and sealing reclosable fastener 130 at predetermined locations on the material from which the liner body 102 is made are important aspects of the invention. Machines commercially available from Z-Patch, Inc. of Carbondale, Ill. are reliable and capable of repeatedly performing the steps referred to in the method described above with high throughput and with low cycle times.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A reclosable bag comprising:
   opposing wall panels, each wall panel being comprised of at least one nylon layer laminated with at least one plastic layer and having inner surfaces, said inner surfaces having an upper portion;
   a reclosable fastener affixed to the upper portions of the inner surfaces, the reclosable fastener having:
     a first continuous, elongated, profile strip with first and second adjacent hooks disposed thereon;
     a second continuous, elongated, profile strip with first and second adjacent hooks disposed thereon; and a plurality of continuous recesses disposed along the length of each of the first and second profile strips, at least one of the recesses being dimensioned to resealably mate with one of the first or second hooks on the opposing strip, at least one continuous recess on each of the first and second profile strip is dimensioned not to mate with the hooks and at least one protuberance along a length of each of the first and second profile strip and dimensioned to fit securely in the continuous recess on each of the first and second profile strip not dimensioned to mate with the hooks all of which are sized, constructed and arranged such that when the profile strips are engaged, they enclose a substantially oxygen-impermeable bag.

2. The reclosable bag of claim 1 wherein the wall panels are comprised of laminated polyethylene and nylon layers.

3. The reclosable bag of claim 1 wherein the wall panels are comprised of a multi-layer, nylon core film.

4. The reclosable bag of claim 1 wherein the elongated profile strips are comprised of at least one of: polypropylene and polyethylene.

5. The reclosable bag of claim 1, wherein said first and second elongated profile strips are substantially without lateral sealing flanges.

6. The reclosable bag of claim 1 further comprising a plurality of ridges on a back side of each of the first and second profile strips.

7. The reclosable fastener of claim 6 wherein at least one of the hooks on the first profile strip is located near the center of the profile strip.

8. The reclosable bag of claim 7 wherein the hooks are substantially symmetrically distributed on two sides of a center axis of the profile strip.

9. The reclosable bag of claim 8, wherein the hooks are mono-hooked ribs of equal height.

10. The reclosable bag of claim 1 wherein the opposing wall panels made from low-density polyethylene (LDPE) and nylon have a tensile strength of between approximately 4800 psi and 7800 psi.

11. The reclosable bag of claim 1 wherein the opposing wall panels made from low-density polyethylene (LDPE) and nylon have water vapor transfer rate, less than or equal to approximately 0.62 grams/100 sq. in/24 hrs.

12. A plastic film bag comprising:
opposing wall panels, each wall panel being made from a laminate of a plastic and nylon, each wall panel having an inner surface and a first, second, third and fourth edge, wherein the opposing wall panels are attached to each other along the first, second and third edges, and a reclosable fastener is affixed to the inner surfaces at about the fourth edges of the wall panels and approximately parallel to the fourth edges of the wall panels, the reclosable fastener comprising:
a first continuous, elongated, profile strip with first and second adjacent hooks disposed thereon, the first hook being disposed at an end of the profile strip and the second hook being located proximal to the first hook; and a second continuous, elongated, profile strip with first and second adjacent hooks disposed thereon, the first hook being disposed at an end of the profile strip and the second hook being located proximal to the first hook; and a plurality of continuous recesses disposed along the length of each of the first and second profile strips, at least one of the recesses being dimensioned to resealably mate with one of the first or second hooks on the opposing strip at least one continuous recess on each of the first and second profile strip is dimensioned not to mate with the hooks and at least one protuberance along a length of each of the first and second profile strip and dimensioned to fit securely in the continuous recess on each of the first and second profile strip not dimensioned to mate with the hooks all of which are and being sized, constructed and arranged to form an airtight and watertight seal for bag wall that are substantially impermeable to oxygen.

13. The reclosable bag of claim 12 wherein the wall panels are comprised of laminated polyethylene and nylon.

14. The reclosable bag of claim 12 wherein the wall panels are comprised of a multi-layer, nylon core film.

15. The reclosable bag of claim 12 wherein the elongated profile strips are comprised of at least one of: polypropylene and polyethylene.

16. The reclosable fastener of claim 12, wherein said first and second elongated profile strips are substantially without lateral sealing flanges.

17. The plastic film bag of claim 12, wherein the reclosable fastener further comprises a plurality of ridges on a back side of each of the first and second profile strips.

18. The plastic film bag of claim 12 wherein at least one continuous recess on each of the first and second profile strip is dimensioned not to mate with the hooks.

19. The plastic film bag of claim 12, wherein at least one of the hooks on the first profile strip is located near the center of the profile strip.

20. The plastic film bag of claim 12, wherein the hooks are substantially symmetrically distributed on two sides of a center axis of the profile strip.

21. The plastic film bag of claim 12, wherein the hooks are mono-hooked ribs of equal height.

22. The reclosable fastener of claim 12 wherein said first and second elongated profile strips are substantially without lateral sealing flanges.

23. The plastic film bag of claim 12 wherein the opposing wall panels made from low-density polyethylene (LDPE) and nylon each have a tensile strength of between approximately 4800 psi and 7800 psi.

24. The plastic film bag of claim 12 wherein the opposing wall panels made from laminated layers of low-density polyethylene (LDPE) and nylon have water vapor transfer rate, less than or equal to approximately 0.62 grams/100 sq. in/24 hrs.

* * * * *